United States Patent
Steinbrenner et al.

[11] Patent Number: 5,706,784
[45] Date of Patent: Jan. 13, 1998

[54] METHOD AND DEVICE FOR CONTROLLING EXHAUST TEMPERATURE FOR A COMBUSTION ENGINE WITH KNOCK CONTROL

[75] Inventors: Ulrich Steinbrenner, Stuttgart; Wolfgang Wagner, Korntal-Münchingen; Christian-Ernst Schreder, Sindelfingen, all of Germany

[73] Assignee: Robert Bosch GmbH, Stuttgart, Germany

[21] Appl. No.: 635,890

[22] PCT Filed: Oct. 12, 1994

[86] PCT No.: PCT/DE94/01200

§ 371 Date: Apr. 23, 1996

§ 102(e) Date: Apr. 23, 1996

[87] PCT Pub. No.: WO95/12062

PCT Pub. Date: May 4, 1995

[30] Foreign Application Priority Data

Oct. 28, 1993 [DE] Germany .................. 43 36 775.5

[51] Int. Cl.$^6$ ........................ F02D 43/00
[52] U.S. Cl. ........................ 123/425
[58] Field of Search ........................ 123/425, 435

[56] References Cited

U.S. PATENT DOCUMENTS 4,825,836  5/1989  Hirose .................. 123/478

FOREIGN PATENT DOCUMENTS 2262615  6/1993  United Kingdom .

*Primary Examiner*—Andrew M. Dolinar
*Attorney, Agent, or Firm*—Kenyon & Kenyon

[57] ABSTRACT

A method and a device for controlling the exhaust temperature for a combustion engine with knock control by varying the air/fuel mixture supplied to the engine as a function of ignition-retard settings to prevent knocking, as are undertaken by a knock-control device, an increasingly retarded ignition (setting) entailing increasing enrichment; the procedure is such that a cylinder-selective enrichment follows in dependence upon the momentary ignition-retard (setting) in a cylinder.

4 Claims, 2 Drawing Sheets

METHOD AND DEVICE FOR CONTROLLING EXHAUST TEMPERATURE FOR A COMBUSTION ENGINE WITH KNOCK CONTROL

FIELD OF THE INVENTION

The present invention relates to a method and a device for controlling exhaust temperature for a combustion engine with knock control.

BACKGROUND INFORMATION

There will be frequent mention in the following of a load or of a load signal. This is a signal that essentially indicates the power output required at the moment from the engine. The load signal is dependent upon the momentary engine-control plan, e.g., either the adjustment angle of the throttle valve, the vacuum prevailing in the intake manifold, or the mass flow of intake air.

For years, the MOTRONIC control unit of Bosch Gmbh, Stuttgart, Germany has been provided with a cylinder-selective knock control and a global prolonging of injection time in conjunction with the knock control. When the knock control establishes knocking in a cylinder, it retards the ignition for this cylinder with a predetermined larger increment and then cancels this ignition retard again in small increments until there is either no longer an ignition retard or no new knocking occurs. When the ignition is retarded, less combustion energy is able to be converted into mechanical energy than before, so that an increased temperature of the exhaust (emissions) results. To prevent this from causing thermal overloading of the engine or of the exhaust manifold, when the sum of the ignition retards for all cylinders exceeds a predetermined value, the injection time is then prolonged to commensurate with an increasing value of the sum. The previously running lambda control is switched off. When the injection time is prolonged, the intake air/fuel mixture is enriched, so that a cooling is achieved.

Thus, the MOTRONIC control unit is a device where an injection time modification device is designed to prolong the injection time for all cylinders, the injection time being calculated by an injection-time control device as a function of the value of the named sum.

U.S. Pat. No. 4,825,836 describes a knock control for a combustion engine, where the ignition-advance angle is retarded for all cylinders as a function of the detected knocking. The rise in the exhaust temperature caused by retarding the ignition-advance angle is limited in that an enrichment of the intake air/fuel mixture is undertaken for all cylinders.

In a method described in British Patent Application No. 2 262 615, the fuel supply and the point of ignition are so adjusted for each individual cylinder that a detected knocking disappears. A direct relation is established between the supplied fuel quantity (or injection duration) and the degree of knocking. The supplied fuel quantity is not oriented here to the exhaust temperature.

SUMMARY OF THE INVENTION

The object of the present invention is to specify a method and a device for controlling the exhaust temperature of a combustion engine having knock control, which will make it possible to prevent local thermal overloading of an engine and of its exhaust manifold.

The present invention makes use of the realization that the cylinder-specific ignition-retard values output by the knock control constitute cylinder-selective values for the ignition, so that they represent a momentary measure of the temperature increase that is to be expected because of the ignition retard in one cylinder and in the corresponding exhaust manifold. As a result, the exhaust temperature can essentially be kept constant, selectively with respect to cylinders, in that a cylinder-selective fuel enrichment follows in dependence upon the retard value of the ignition for a specific cylinder.

A map is preferably used which stores maximum values (settings) for the fuel enrichment, these values being addressable by way of speed and load values and consisting of those values which apply when the ignition-advance angle is retarded in the maximally permissible manner and which, nevertheless, are not supposed to exceed a predetermined exhaust temperature. These maximum values are then only used fractionally for the enrichment (process) when an active ignition-retard (setting) remains under the maximum possible ignition-related setting. This procedure ensures that over-enrichment will never occur, thus that unacceptably poor exhaust values or unacceptably high fuel-consumption values will never be reached.

The method and the device according to the present invention make it possible to reliably avoid local thermal overloading while employing less fuel enrichment than under known methods heretofore. Under existing prior art, the mixture is enriched for all cylinders even when knocking only occurs in one single cylinder. To nevertheless avoid inadequate exhaust values and elevated consumption, the prior art provides for the least possible enrichment to be carried out. The result can be, however, when only one single cylinder knocks heavily, that this cylinder is not able to be sufficiently cooled. The present invention eliminates all of these disadvantages.

DETAILED DESCRIPTION OF THE INVENTION

Figure 1:
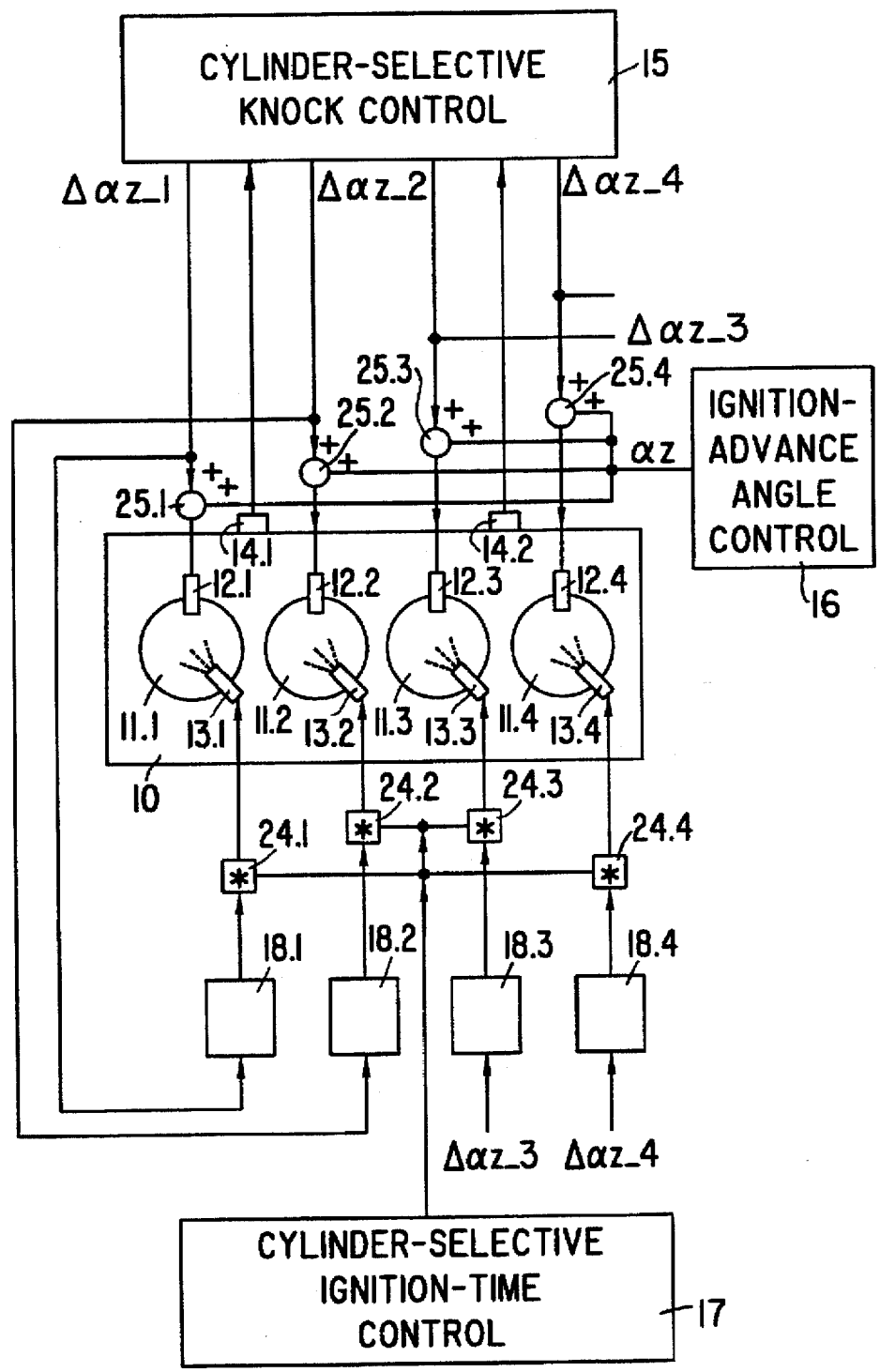
FIG. 1 shows a schematic representation of an internal combustion engine, according to an embodiment of the present invention.

FIG. 1 depicts schematically, an internal combustion engine 10 with four cylinders 11.1 through 11.4. Assigned to each cylinder is one of four spark plugs 12.1 through 12.4 and one of four injectors 13.1 through 13.4. Arranged on the cylinder block are two knock sensors 14.1 and 14.2, whose output signals are fed to a knock-control device 15. The point of ignition for the spark plugs is set by means of the output signals from this knock-control device is, together with the output signals from an ignition-timing (ignition-advance angle) control device 16. The activations of the injectors are determined by the output signal from a shared injection-time control device 17, together with the output signal from one of four injection-time modification units 18.1 through 18.4.

Figure 2:
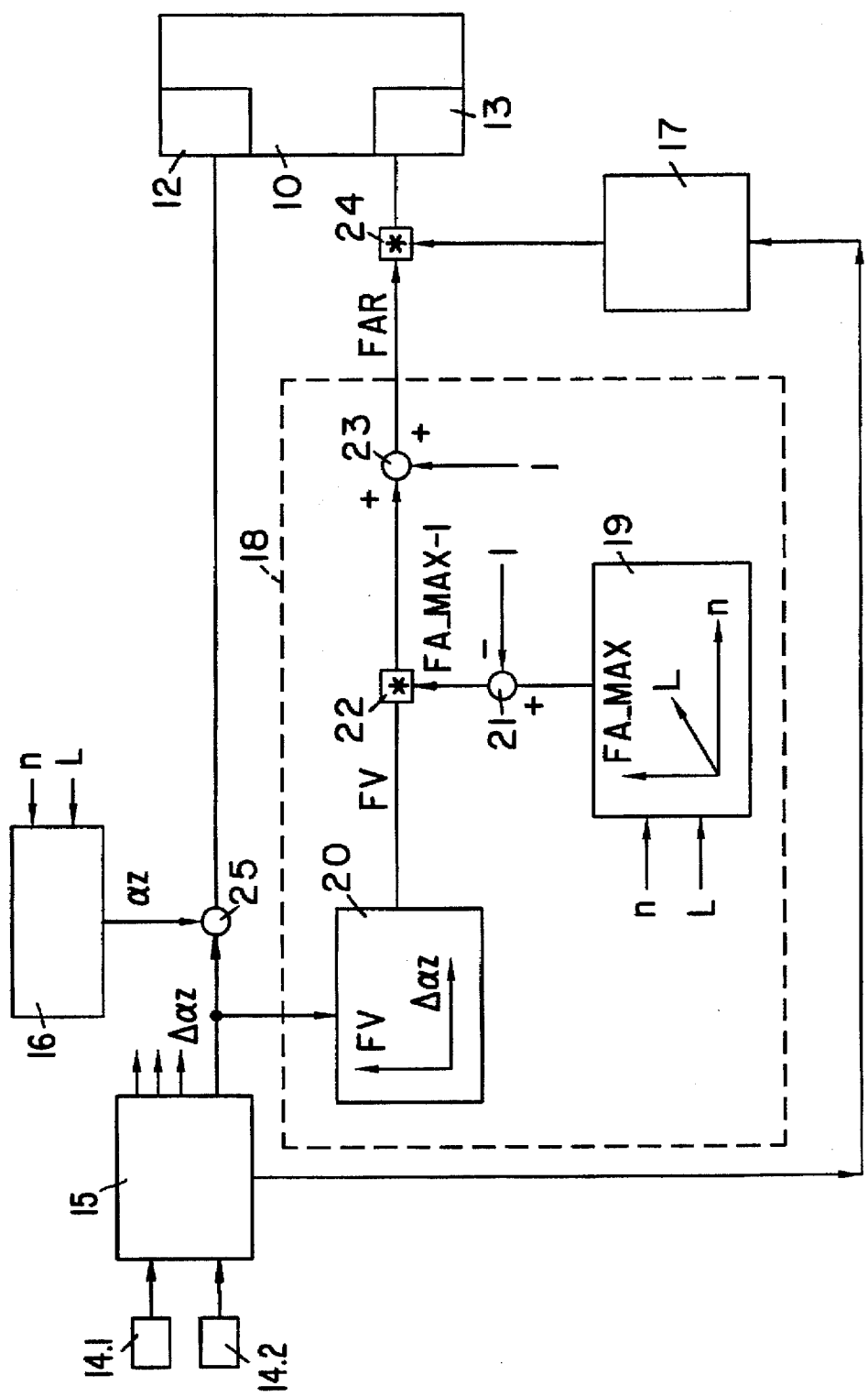
FIG. 2 shows a functional diagram of the present invention.

FIG. 2 illustrates the functioning of the modification units 18.1 through 18.4 as a functional block diagram. The four above-named units will be represented here by one single modification unit 18. This modification unit 18 is provided with a maximum-enrichment map 19, a reduction-factor map 20, a subtractor point 21, a multiplier point 22, and a summing point 23. The output signal from this modification unit 18 is gated (combined) multiplicatively in a factor-multiplier point 24 with the output signal from the injection-time control 17; the thus generated injection-time signal is fed to one of the injectors 13.1 through 13.4 with which the modification unit 18 is currently associated.

When the engine 10 is operated at a specific speed n and with a specific load L, the ignition-timing control 16 determines an appropriate ignition-advance angle jointly for all cylinders. When the engine is operated with this ignition-advance angle, knocking can occur in at least one of the cylinders, and this knocking is determined by the knock sensors 14.1 and 14.2 thereby generating two sensor signals. From the two signals, the knock-control device 15 recognizes in which cylinder knocking combustion has occurred. It then outputs an ignition-timing modification (change of ignition-advance angle) $\Delta\alpha z$ for this cylinder. This value is added in an angle summing point 25 to the ignition-advance angle $\alpha z$ generated by the ignition-timing control 16, and the spark plug of the cylinder in question is then ignited in accordance with this summed ignition-advance angle. At the same time, the angle-modification signal $\Delta\alpha z$ is fed to the modification unit 18.

Before explaining further what effect the angle-modification signal $\Delta\alpha z$ has in the modification unit 18, the functioning of the maximum-enrichment map 19 will be described. It is set up as follows. The engine is operated with gasoline with such a strong knocking tendency and very warm intake air that the maximum permissible angle modification has to be retarded (shifted toward retard) to prevent knocking. It is then determined how heavily the mixture supplied to the engine has to be enriched to prevent the exhaust temperature from exceeding a permissible value. The degree of enrichment is expressed as an enrichment factor. This factor can rise up to the, for example value 2, thus that the engine is supplied with twice as much fuel as would be required stoichiometrically. Such an enrichment factor is determined for various combinations of the speed n and the load L and is input into the maximum-enrichment map 19 as a factor that is addressable by way of the momentary values of n and L.

If the engine is operated under fewer unfavorable conditions than had been put in (centered) to set up the maximum-enrichment map, then a smaller angle modification than the maximum possible one suffices to prevent knocking. If the maximum possible angle modification $\Delta\alpha z$ amounts, for example, to 15° and if a maximum enrichment factor of 1.5 is then required when working with a certain combination of the values of n and L to prevent the exhaust temperature from exceeding the predetermined value, then the enrichment factor, as is required in response to an angle modification of only 5° given the same values of n and L, amounts only to 1.1 so as not to allow the temperature to rise above the indicated value. Thus, the maximum enrichment factor must be modified as a function of the value of the momentary angle modification $\Delta\alpha z$. The reduction-factor map 20 serves for this purpose.

The various functional groups within the modification unit 18 interact so as to satisfy the following relation for each cylinder i:

$$FAR = FV\_i(\Delta\alpha z\_i) \cdot (FA\_MAX - 1) + 1$$

$FV\_i$ is the reduction factor (factor less than 1) read out of the reduction-factor map 20 associated with the current angle modification $\Delta\alpha z$. FA_MAX is the maximum-enrichment factor read out of the maximum-enrichment factor map 19 for the momentary values of n and L. The multiplication indicated in the above equation is performed in the multiplication point 22, the subtraction of the value 1 from the value FA_MAX is performed in the subtraction point 21, and the addition of the value 1 is performed in the summing point 23. The thus generated enrichment factor FAR is multiplied in the factor-multiplication point 24 by the injection time output from the injection-time control 17. The lambda control is thereby switched off within the injection-time control 17, while the enrichment is activated due to the knock-prevention function. To terminate the lambda control, the injection-time control 17 receives a signal from the knock control 15, which indicates that such a large angle modification is output that the fuel must be enriched to compensate for the temperature increase actually resulting therefrom.

In the described embodiment of the present invention, a momentary reduction factor FV is read out of the reduction-factor map 20 only in dependence upon the angle modification $\Delta\alpha z$. However, this map can also still be load-dependent and speed-dependent.

In another embodiment of the present invention, instead of starting out from a maximum enrichment factor FA_MAX for each pair of speed and load values and modifying this factor by a reduction factor, the procedure can also be such that enrichment factors greater than 1 are read out of a characteristic curve or a map, into which other quantities also enter, as a function of the ignition-timing modification (change of ignition-advance angle) $\Delta\alpha z$ and that this value is then limited to a maximum permissible value as a function of the momentary speed and load values. However, the procedure described on the basis of FIG. 2 is particularly well suited. In yet another embodiment of the present invention, it is equally possible to use more than two knock sensors or just one knock sensor. Cylinder-selective knock detection is also possible in the latter case when all knock signals can be reliably detected, since a detected knock signal can always come only from the cylinder where ignition had just occurred.

We claim:

1. A method for controlling an exhaust temperature of a combustion engine, the combustion engine having a knock control device and at least one cylinder, the knock control device associated with the at least one cylinder, the knock control device generating at least one ignition-retard value for each of the at least one cylinder, the method comprising the steps of:

establishing a knocking in the at least one cylinder by using the knock control device;

modifying the at least one ignition-retard value of the knock control device when the knocking is established;

varying an air/fuel mixture supplied to the combustion engine as a function of the at least one ignition-retard value of the associated at least one cylinder, the air/fuel mixture being varied to prevent knocking in the at least one cylinder by the knock control device, the air/fuel mixture being increasingly enriched when the at least one ignition-retard value is increased, the air/fuel mixture for each of the at least one cylinder being selectively enriched;

presetting the at least one ignition-retard value as a maximum ignition-retard value, the combustion engine including at least one modification unit and generating a load signal and a speed signal, each of the at least one modification unit including an associated maximum enrichment map unit for storing at least one predetermined signal value of each of the load signal and the speed signal as at least one predetermined load/speed signal value pair;

defining a maximum enrichment factor value based on the at least one predetermined load/speed signal value pair by the associated maximum enrichment map unit;

maintaining the exhaust temperature under a predetermined temperature value as a function of at least one of the maximum ignition-retard value and the maximum enrichment factor value; and modifying the maximum enrichment factor value, the load signal and the speed signal each generating instantaneous signal values, the maximum enrichment factor value being based on the at least one instantaneous speed signal value and the at least one instantaneous load signal value, the at least one modification unit including an associated reduction factor map for generating an associated reduction factor based on the at least one ignition-retard value of the at least one cylinder; and wherein the maximum enrichment factor is reduced by one to produce a modified maximum enrichment factor, the modified maximum enrichment factor is multiplicatively revised by the reduction factor, and the maximum enrichment factor value is modified to prevent an over-enrichment of the air/fuel mixture that would adversely affect the exhaust temperature and a consumption of fuel in the combustion engine.

2. A method for controlling an exhaust temperature of a combustion engine, the combustion engine including a knock control device, a plurality of cylinders and at least one modification unit, the knock control device associated with the plurality of cylinders and generating at least one ignition-retard value for each of the plurality of cylinders, the at least one modification unit having an associated reduction factor map for generating an associated reduction factor and an associated maximum enrichment map unit defining a maximum enrichment factor value, the method comprising the steps of:

establishing a knocking in at least one of the plurality of cylinders by using the knock control device;

modifying the at least one ignition-retard value of the knock control device when the knocking is established; and varying an air/fuel mixture supplied to the combustion engine as a function of the at least one ignition-retard value of an associated one of the plurality of cylinders, the associated reduction factor and the maximum enrichment factor value, the air/fuel mixture being varied to prevent knocking in at least one of the plurality of cylinders by the knock control device, the air/fuel mixture being increasingly enriched when the at least one ignition-retard value is increased, the air/fuel mixture being selectively enriched for the plurality of cylinders.

3. The method as recited in claim 2, further comprising the steps of:

presetting the at least one ignition-retard value as a maximum ignition-retard value, the associated maximum enrichment map unit storing at least one predetermined signal value of each of the load signal and the speed signal as at least one predetermined load/speed signal value pair, the maximum enrichment factor value being based on the at least one predetermined load/speed signal value pair; and maintaining the exhaust temperature under a predetermined temperature value as a function of at least one of the maximum ignition-retard value and the maximum enrichment factor value.

4. A device for controlling an exhaust temperature of a combustion engine, the combustion engine including an ignition device, a plurality of cylinders and at least one injector, the device comprising:

a knock-control device for determining a knocking in the plurality of cylinders and generating at least one cylinder-selective retard-modification value for ignition of the engine corresponding to one of the plurality of cylinders, the knock-control device being associated with the plurality of cylinders and varying an air/fuel mixture supplied to the engine as a function of the at least one cylinder-selective retard-modification value, the air/fuel mixture being increasingly enriched when the at least one cylinder-selective retard-modification value is increased, the air/fuel mixture being selectively enriched for the plurality of cylinders;

an ignition-advance angle control device generating an associated ignition-advance angle and receiving the at least one cylinder-selective retard-modification value, the ignition-advance angle control device modifying the associated ignition-advance angle based on the at least one cylinder-selective retard-modification value;

an injection-time control device associated with the knock control device for determining an injection time for opening the at least one injector; and at least one modification device including an associated reduction factor map for generating an associated reduction factor and an associated maximum enrichment map unit defining a maximum enrichment factor value, each of the at least one modification device being associated with a respective one of the plurality of cylinders of the combustion engine, each of the at least one modification device modifying the injection time determined by the injection-time control device for the associated cylinder as a function of the at least one cylinder-selective retard-modification value, the associated reduction factor and the maximum enrichment factor value.

* * * * *

UNITED STATES PATENT AND TRADEMARK OFFICE
CERTIFICATE OF CORRECTION

PATENT No. : 5,706,784

DATED : January 13, 1998

INVENTOR(S): STEINBRENNER, Ulrich; WAGNER, Wolfgang; and SCHREDER, Christian-Ernst It is certified that error appears in the above-identified patent and that said Letters Patent is hereby corrected as shown below:

Column 2, line 21, "ignition-related" should be --ignition-retard--;

Column 2, line 48, after "schematically" delete -- , --;

Column 2, line 55, "is" should be --15,--;

Column 3, line 13, after "14.2" insert -- , --;

Column 3, line 43, "(centered)" should be --(entered)--; and

Column 3, line 35, "the, for example" should be --, for example, the--.

Signed and Sealed this

Tenth Day of August, 1999

Attest:

Q. TODD DICKINSON

*Attesting Officer*     *Acting Commissioner of Patents and Trademarks*